UNITED STATES PATENT OFFICE.

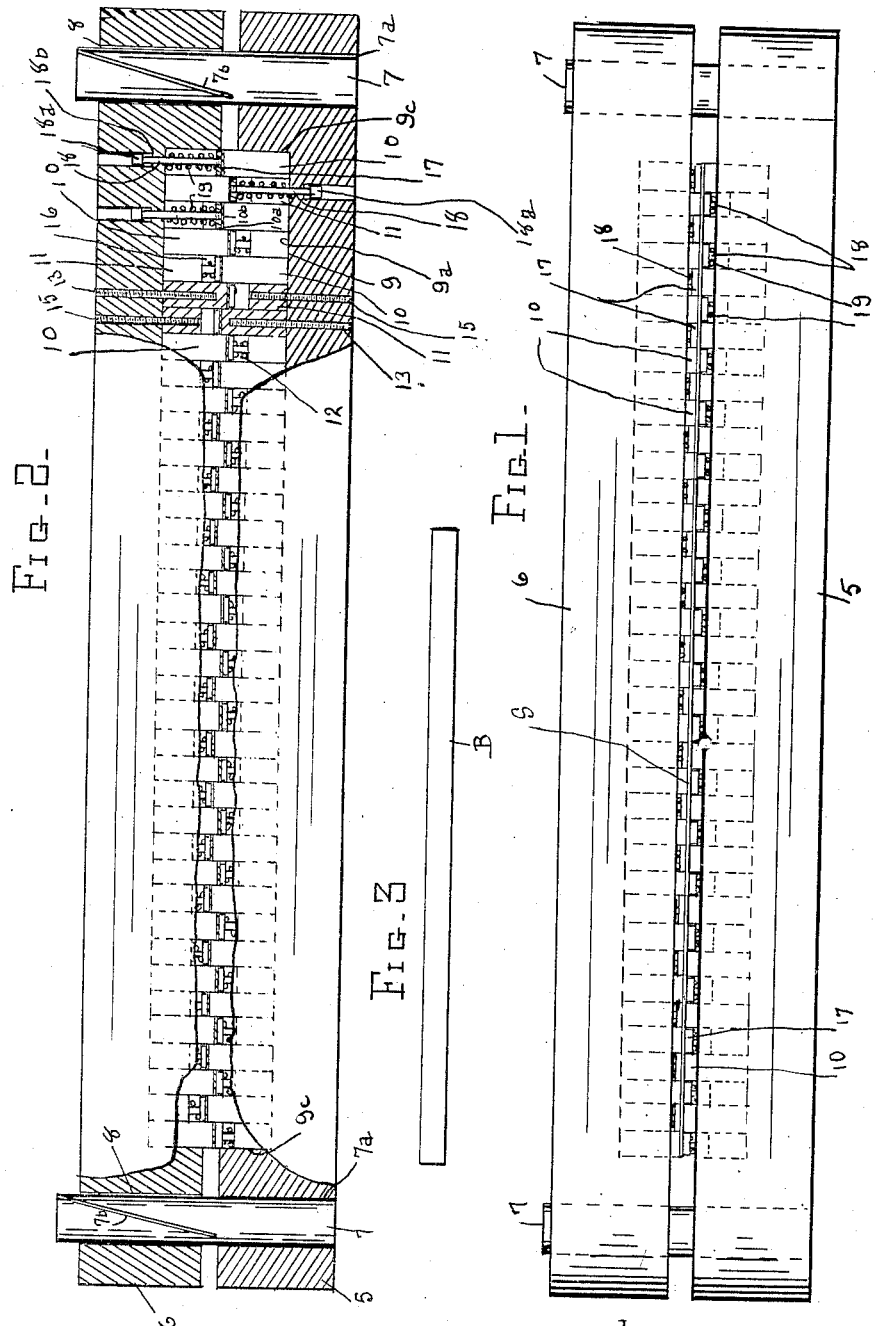

JOHN T. MURPHY AND PATRICK P. MURPHY, OF CHICOPEE FALLS, MASSACHUSETTS.

PROCESS AND MEANS FOR CUTTING.

1,343,639.  Specification of Letters Patent.  Patented June 15, 1920.

Application filed February 13, 1919, Serial No. 276,769. Renewed April 1, 1920. Serial No. 370,537.

*To all whom it may concern:*

Be it known that we, JOHN T. MURPHY and PATRICK P. MURPHY, citizens of the United States of America, and residents of Chicopee Falls, in the county of Hampden and State of Massachusetts, have invented certain new and useful Improvements in Processes and Means for Cutting, of which the following is a full, clear, and exact description.

This invention relates to a process and means for cutting or blanking metal for saw blades.

One of the objects of the invention is to provide a process and means for simultaneously producing a large number of blanks without waste of metal and without deformation of the blanks.

The process and means are especially designed for the production of blanks for the manufacture of saw blades, and permits of the production of a large number of blanks for saw blades from a sheet of steel or other metal without the waste of a particle of metal and in such manner that the blades are of uniform width and devoid of high spots or similar defects.

With the above and other objects in view the invention relates to certain steps, combinations, construction and arrangements of parts clearly described in the following specification and fully illustrated in the accompanying drawings, in which:—

Figure 1 is a side elevation of a set of dies shown with a sheet of steel therebetween in position for blanking the sheet into a plurality of blanks for saw blades.

Fig. 2 is a longitudinal sectional view showing the manner in which the die is constructed and the way in which the blanks are displaced after the sheet is cut.

Fig. 3 is a plan view of one of the blanks for the manufacture of a saw blade.

Figure 4:
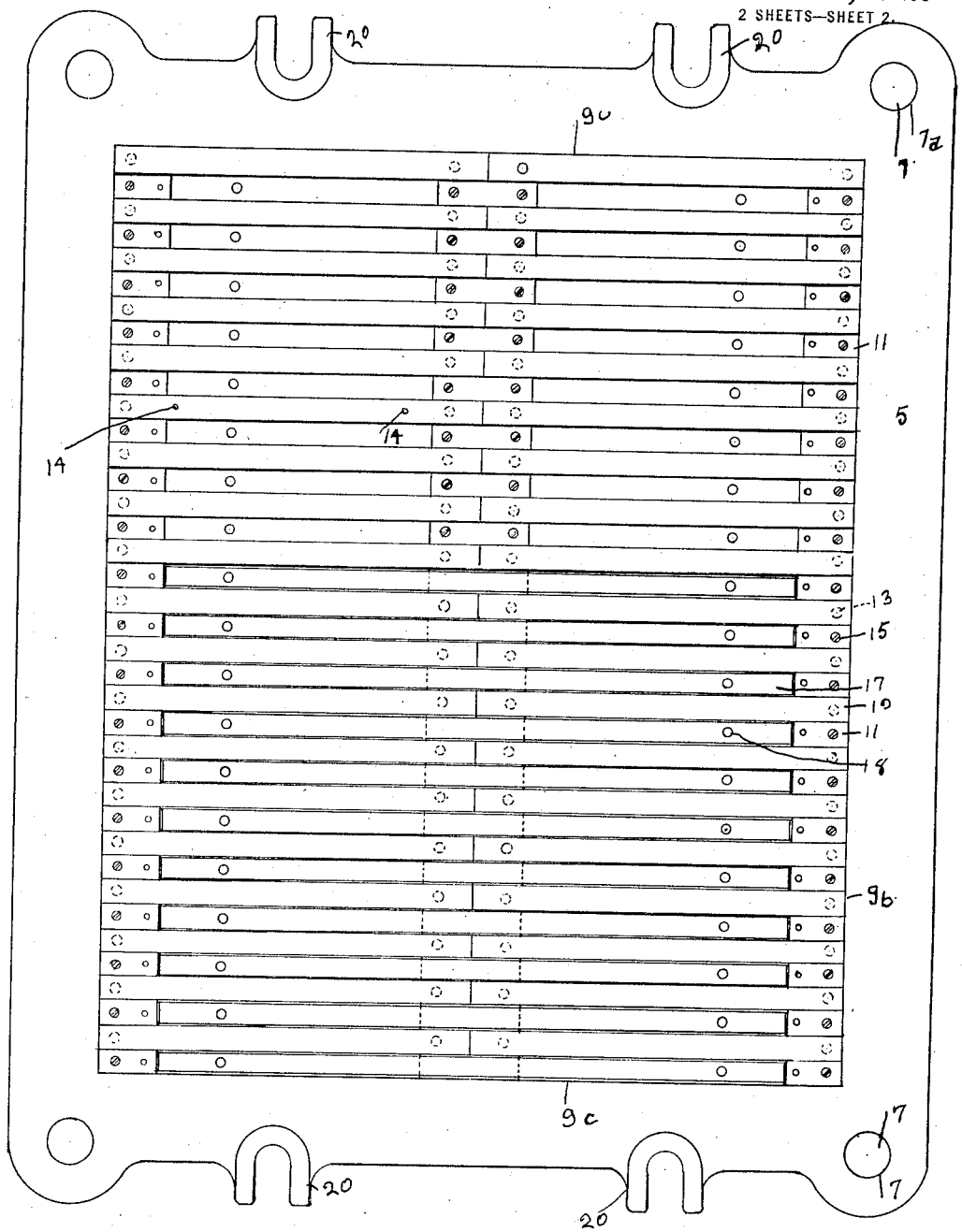
Fig. 4 is a plan view of one of the dies.

Referring to the accompanying drawings 5 designates the body or frame of the lower die member and 6 the body or frame of the upper die member. The lower die member is equipped with four posts 7 which are driven into openings $7^a$ located in the four corners thereof. The upper die member 6 is provided with four openings 8 adapted to slidably receive the posts 7. The die frame 6 is reciprocated by suitable operating means clamped thereto and is held in correct alinement with the die frame 5 by means of the posts 7. The engagement of the frame 6 with the post 7 is lubricated by means of a spiral groove $7^b$ formed in said post 7.

The lower die frame 5 is formed with a relatively large rectangular pocket 9 which includes a base wall $9^a$ side walls $9^b$, and end walls $9^c$ which are disposed in perpendicular relation to each other. The upper die member is similarly constructed and the pockets of the two die members or frames are of exactly equal area and proportions.

On the wall $9^a$ a series of rectangular cutting elements are disposed, which consist of heat treated steel blocks 10 each one of which is provided with sharp corner portions $10^a$ and a flat top $10^b$. The cutting elements 10 are spaced from each other by spacing blocks 11 which are of exactly equal width to the blocks 10. The blocks 11 are considerably narrower than the blocks 10 whereby said blocks 10 will project above the blocks 11 and rectangular die pockets or spaces 12 will be formed between the opposing sides of the blocks 10.

The blocks 10 are fastened in place to the frame 5 by means of screws 13 and dowel pins 14. The screws 13 extend through the wall $9^a$ and through the base of the block 10 through the major portion of the body thereof, but do not extend through the top of the block. The blocks 11 are secured in place by screws 15 which may extend through the top thereof.

A similar set of cutting blocks and spacing blocks are connected in a similar manner to the upper die frame members 6, but the blocks 10 of the upper die frame are arranged to enter the pockets 12 provided in the lower die assemblage while the blocks 11 of the upper die assemblage provide spaces 16 to receive the blocks 10 of the lower die assemblage. It will be seen, therefore, that the upper blocks 10 are arranged in staggered relation to the lower blocks 10 and in alinement with the spacing blocks 11 of the lower die frame, while the cutting blocks 10 of the lower die frame are arranged in alinement with the spacing blocks 11 of the upper die frame. The cutting blocks 10 of the lower die frame have an accurate fit in the spaces between the cutting blocks 10 of the upper die frame.

In the spaces 12 of the lower die assemblage a series of stripper bars 17 are arranged. The stripper bars 17 are connected with the screws 18 which slide through the wall 9ª of the frame 5 and are provided with heads 18ª which are adapted to abut against the shoulders 18ᵇ formed in said wall 9ª. Springs 19 are arranged around the screws or guide rods 18 and are adapted to keep said stripper bars 17 flush with the upper surfaces of the blocks 10. A similar set of stripper bars is arranged in a similar manner in the spaces 16 of the upper die frame.

The spacing blocks 11 are considerably shorter than the cutting blocks 10, and three of such spacing blocks are used between the sides of each pair of cutting blocks, two spacing blocks being located at the ends of the cutting blocks and one in the center of the space therebetween. These blocks are positively secured to their frame so as to provide lateral support for the cutting blocks. Since it is difficult to heat treat long steel bars we prefer to employ a sectional construction for the bars or blocks 10, and these bars are shown, therefore, to consist of two sections, the meeting ends of which abut at the median longitudinal line of the die frame.

The stripper bars are adapted to slide easily between the blocks 10, so that they will not bind against the sides thereof. Each die frame is shown to be equipped with a pair of bifurcated lugs 20 on each end, whereby it may be clamped in operative relation to the die press.

Our improved cutting and blanking process is carried out with the foregoing equipment, though it is apparent that slight structural changes might be employed and the process realized with a die assemblage thus modified.

In blanking, the metal sheet S, shown in Fig. 1 is placed between the upper and lower set of die blocks 10 and pressure applied to cause the opposing ends of said blocks to cut through the metal and enter the spaces between themselves, as shown in Fig. 2. The area of the end faces of the die blocks 10 equals the area of the sheet to be cut, so that when the sheet is sheared it will be divided into portions equal to the sum of the areas of the spaces between the blocks 10. When the die frames are separated from each other the stripper bars will force the blanks out of the spaces 12 and 16 into line with the end faces of the lower set of cutting blocks 10, when the machine operator may collect all the blanks thus made by a single hand movement across the face of the lower die frame.

In the initial movement, as shown in Fig. 1 the raw stock or sheet is subjected to a pressure operation which tends to correct any slight surface deformations which may exist in the stock or sheet. When the sheet or stock is thus sheared into the blanks the portions which form the blanks are again subjected to considerable pressure, which maintains the metal or material against any tendency to warp or distort. When the cutting blocks are forced by the continued pressure through the metal or other material being worked a uniform cutting action is maintained over and on the material or metal. It is impossible for the die parts, or the cutting edges of the die blocks 10 to yield in the slightest, and as there is no space between the engaged surfaces of the die blocks 10 it is impossible for metal or the material to bur off between the interfitting die blocks. The result is that the finished blank is formed with clean smooth edges. As there is no sliding action of the die blocks against each other the corners of these blocks will stand up against wear losses for long periods of time. As the cutting action is developed by direct pressure and lateral displacement of one set of dies when engaging the metal or material in cutting is not possible, the blanks cut will not contain any "high spots" or other imperfections which would require that they be subjected to costly finishing operations.

Having described our invention we claim:

1. A cutting mechanism for manufacturing saw blade blanks consisting of a die frame, cutting blocks secured to the die frame, spacing blocks secured between the cutting blocks and of less height than the cutting blocks and adapted to maintain said cutting blocks in true parallel relation with each other and provide lateral supports therefor, a second die frame, a second set of cutting blocks arranged on said second die frame, and spacing blocks secured between the second set of cutting blocks and adapted to maintain the members of said second set in rigid parallel relation to each other, the cutting blocks of the second set having a close fit between the cutting blocks of the first set.

2. A process of making blanks for hack saw blades consisting in subjecting a sheet having a width equal to the length of the blades to be made to a cutting action between a series of dies presenting to the sheet a surface area equal to that of the sheet and of a length equal to that of the individual blank to be formed and of a width equal to that of said blank, said dies being arranged in opposing sets and the members of each set being rigidly spaced from each other to snugly receive the members of the other set, and operating said die sets to cause the members thereof to simultaneously engage the sheet and with equally distributed tension sever said sheet into a plurality of blanks of equal width and a length equal to the width of the sheet.

3. A mechanism for manufacturing hack saw blade blanks consisting of opposing die retaining frames, a series of die blocks secured to one of said frames and having a width equal to that of the hack saw blades to be formed and length equal to that of the hack saw blades to be formed, blocks for spacing said die blocks from each other and having a width and length equal to that of the die blocks, a similar set of dies and die blocks arranged on the other die frame so that the spaces between the second set of die blocks will receive the first named die blocks and the second named die blocks will fit in the spaces between the first named die blocks, yielding stripper plates movable between the respective die blocks and means for guiding the movement of the frames toward each other.

4. The process of making blanks for hack saw blades consisting in subjecting a sheet of hardened and tempered steel from which the blanks are to be formed to a cutting action between a series of dies having a total transverse area equal to the width of the sheet, said dies being arranged in opposing sets and the members of each set being rigidly spaced from each other to snugly receive the members of the other set, and operating said die sets to cause the members thereof to simultaneously engage the opposite faces of the sheet and sever said sheet into a plurality of strips equal to the widths of the blanks desired.

5. A mechanism for manufacturing hack saw blade blanks consisting of opposing die retaining frames, a series of die blocks secured to one of said frames and having a width equal to that of the hack saw blade to be formed, spacing blocks having a width equal to that of the die blocks arranged alternately between the die blocks and with their outer faces located in a different plane than the working faces of the die blocks, a similar set of dies and die blocks similarly arranged on the other die frame so that the spaces between the second set of die blocks will receive the first named die blocks and the second named die blocks will fit in the spaces between the first named die blocks, yielding stripper plates movable between the respective die blocks, and means for guiding the movement of the frames toward each other.

Signed by us at Springfield, Massachusetts.

JOHN T. MURPHY.
PATRICK P. MURPHY.